United States Patent
Halfant

(10) Patent No.: US 7,269,785 B1
(45) Date of Patent: Sep. 11, 2007

(54) DIGITAL MANIPULATION OF VIDEO IN DIGITAL VIDEO PLAYER

(75) Inventor: Matthew D. Halfant, San Jose, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 0 days.

(21) Appl. No.: 09/475,093

(22) Filed: Dec. 30, 1999

(51) Int. Cl.
*G06F 15/00* (2006.01)

(52) U.S. Cl. .................... 715/500.1; 715/723

(58) Field of Classification Search .......... 345/302, 345/327, 328, 431, 716, 719, 723; 715/500.1, 715/716, 719, 723
See application file for complete search history.

(56) References Cited

U.S. PATENT DOCUMENTS

| | | | | |
|---|---|---|---|---|
| 5,644,364 A * | 7/1997 | Kurtze et al. ............... 348/584 |
| 5,652,917 A * | 7/1997 | Maupin et al. .............. 710/68 |
| 5,864,682 A * | 1/1999 | Porter et al. ............... 709/247 |
| 5,870,087 A * | 2/1999 | Chau .......................... 345/302 |
| 5,886,733 A * | 3/1999 | Zdepski et al. ............. 725/64 |
| 5,889,515 A * | 3/1999 | McDade et al. ............ 345/302 |
| 5,917,553 A * | 6/1999 | Honey et al. ............... 348/578 |
| 5,923,814 A * | 7/1999 | Boyce ......................... 386/109 |
| 5,929,857 A * | 7/1999 | Dinallo et al. ............. 345/354 |
| 5,929,942 A * | 7/1999 | Porrka et al. ............... 348/722 |
| 5,960,464 A * | 9/1999 | Lam ............................ 711/206 |
| 6,034,733 A * | 3/2000 | Balram et al. .............. 348/448 |
| RE36,647 E * | 4/2000 | Maupin et al. ............. 710/8 |
| 6,055,478 A * | 4/2000 | Heron ........................ 701/213 |
| 6,067,126 A * | 5/2000 | Alexander ................ 348/738 |
| 6,075,574 A * | 6/2000 | Callway ..................... 348/673 |
| 6,133,910 A * | 10/2000 | Stinebruner ................ 725/49 |
| 6,141,017 A * | 10/2000 | Cubillo et al. ............. 345/660 |
| 6,141,060 A * | 10/2000 | Honey et al. ............... 348/578 |
| 6,141,693 A * | 10/2000 | Perlman et al. ............ 709/236 |
| 6,157,396 A * | 12/2000 | Margulis et al. ........... 345/506 |
| 6,185,329 B1 * | 2/2001 | Zhang et al. ............... 382/176 |
| 6,263,022 B1 * | 7/2001 | Chen et al. ............. 375/240.03 |
| 6,266,374 B1 * | 7/2001 | Choi ...................... 375/240.21 |
| 6,298,145 B1 * | 10/2001 | Zhang et al. ............... 382/103 |
| 6,317,795 B1 * | 11/2001 | Malkin et al. ............. 709/246 |
| 6,323,878 B1 * | 11/2001 | Haffey et al. .............. 345/660 |
| 6,342,904 B1 * | 1/2002 | Vasudevan et al. ........ 715/723 |
| 6,357,042 B2 * | 3/2002 | Srinivasan et al. .......... 725/32 |
| 6,400,886 B1 * | 6/2002 | Brewer et al. ............. 386/52 |
| 6,408,128 B1 * | 6/2002 | Abecassis .................. 386/68 |
| 6,415,101 B1 * | 7/2002 | deCarmo et al. .......... 386/105 |
| 6,418,166 B1 * | 7/2002 | Wu et al. ................ 375/240.12 |
| 6,456,779 B1 * | 9/2002 | Saib ............................ 386/52 |
| 6,476,873 B1 * | 11/2002 | Maeng ........................ 348/561 |

(Continued)

OTHER PUBLICATIONS

Chen et al., Extraction of High-Resolution Video Stills from MPEG Images Sequences, IEEE, pp. 465-469.*

(Continued)

*Primary Examiner*—Cong-Lac Huynh
(74) *Attorney, Agent, or Firm*—Beyer Weaver LLP

(57) ABSTRACT

According to the invention, a technique for operating a digital versatile disk (DVD) system is disclosed. First digital information is read from a DVD player. The first digital information is decompressed to create second digital information that is stored. In order to produce third digital information different from the second digital information, the second digital information is manipulated. At some point, the third digital information is displayed.

21 Claims, 8 Drawing Sheets

U.S. PATENT DOCUMENTS

| | | | |
|---|---|---|---|
| 6,480,629 B1* | 11/2002 | Bakhmutsky | 382/236 |
| 6,490,324 B1* | 12/2002 | McDade et al. | 375/240.25 |
| 6,493,872 B1* | 12/2002 | Rangan et al. | 725/32 |
| 6,496,692 B1* | 12/2002 | Shanahan | 455/418 |
| 6,496,980 B1* | 12/2002 | Tillman et al. | 725/90 |
| 6,501,797 B1* | 12/2002 | van der Schaar et al. | 375/240.12 |
| 6,510,553 B1* | 1/2003 | Hazra | 725/87 |
| 6,516,340 B2* | 2/2003 | Boys | 709/204 |
| 6,546,113 B1* | 4/2003 | Lucas et al. | 382/100 |
| 6,549,211 B1* | 4/2003 | Ghosh et al. | 345/561 |
| 6,549,577 B2* | 4/2003 | Florencio et al. | 375/240.21 |
| 6,553,178 B2* | 4/2003 | Abecassis | 386/83 |
| 6,560,280 B1* | 5/2003 | Shachar et al. | 375/240 |
| 6,567,825 B2* | 5/2003 | Bogia | 707/200 |
| 6,571,054 B1* | 5/2003 | Tonomura et al. | 386/95 |
| 6,637,032 B1* | 10/2003 | Feinleib | 725/110 |
| 6,639,943 B1* | 10/2003 | Radha et al. | 375/240.11 |
| 6,650,783 B2* | 11/2003 | Hamanaka | 382/240 |
| 6,654,031 B1* | 11/2003 | Ito et al. | 715/723 |
| 6,670,966 B1* | 12/2003 | Kusanagi | 715/723 |
| 6,675,352 B1* | 1/2004 | Osaki et al. | 715/512 |
| 6,677,961 B1* | 1/2004 | Bhat | 715/723 |
| 6,704,357 B1* | 3/2004 | Ketcham | 375/240.01 |
| 6,714,216 B2* | 3/2004 | Abe | 715/723 |
| 6,721,952 B1* | 4/2004 | Guedalia et al. | 725/38 |
| 6,757,860 B2* | 6/2004 | Choi et al. | 714/757 |
| 6,771,704 B1* | 8/2004 | Hannah | 375/240.16 |
| 6,791,579 B2* | 9/2004 | Markel | 715/719 |
| 6,792,044 B2* | 9/2004 | Peng et al. | 375/240.03 |
| 6,940,905 B2* | 9/2005 | Van Der Schaar et al. | 375/240.12 |
| 7,006,569 B1* | 2/2006 | Shin et al. | 375/240.12 |
| 7,055,100 B2* | 5/2006 | Moriwake et al. | 715/723 |
| 7,200,813 B2* | 4/2007 | Funaki | 715/716 |
| 2002/0136540 A1* | 9/2002 | Adams et al. | 386/125 |
| 2004/0223653 A1* | 11/2004 | Rose | 382/238 |

OTHER PUBLICATIONS

Liu, MPEG Decoder Architecture for Embedded Applications, IEEE, Aug. 14, 1996, pp. 1021-1028.*

Altunbasak et al., A fast method of reconstructing high-resolution panoramic stills from MPEG-compressed video, IEEE 1998, pp. 99-104.*

Kobla et al., Extraction of features for indexing MPEG-compressed video, IEEE 1997, pp. 337-342.*

Shi et al., A fast MPEG video encryption algorithm, ACM 1998, pp. 81-88.*

Chiueh et al., Zodiac : A History-Based Interactive Video Authoring System, ACM 1998, pp. 435-444.*

Guo et al., Fast and Adaptive Semantic Object Extraction from Video, IEEE 1999, pp. 1417-1421.*

Yeadon et al., Supporting Video in Heterogeneous Mobile Environments, ACM 1998, pp. 439-444.*

Sale et al., Super-Resolution Enhancement of Night Vision Image Sequences, IEEE 2000, pp. 1633-1638.*

Shah et al., Resolution Enhancement of Color Video Sequences, IEEE 1999, pp. 879-885.*

Schultz et al., Improved Definition Video Frame Enhancement, IEEE 1995, pp. 2169-2172.*

Chen et al., Extraction of High-Resolution Video Stills from MPEG Images Sequences, IEEE 1998, pp. 465-469.*

"*MPEG Decoder Architecture for Embedded Applications*", Liu et al., IEEE Transcriptions On Consumer Electronics, vol. 42, No. 4, Nov. 1996, pp. 1021-1028.

"*Extraction of High-Resolution Video Stills from MPEG Image Sequences*", Chen et al., 1998 IEEE, pp. 465-469.

"*High-Resolution Image Reconstruction from Lower-Resolution Image Sequences and Space Varying Image Restoration*", Tekalp et al., 1992, IEEE International Conference on Acoustics, pp. 169-172.

"*The Estimation of Velocity Vector Fields from Time-Varying Image Sequences*", Sergei V. Fogel, Image Understanding, vol. 53, No. 3, May 1991, pp. 253-287.

* cited by examiner

DIGITAL MANIPULATION OF VIDEO IN DIGITAL VIDEO PLAYER

BACKGROUND OF THE INVENTION

This invention relates in general to digital video player systems and, more specifically, to an apparatus and methods for allowing digital manipulation of video information.

Digital video playback is available in consumer products. For example, digital versatile disks (DVD) are optical disks which store videos in compressed digital form. The MPEG2 codec is used to compress the video such that a whole movie can fit onto a single five and a quarter inch optical disk.

DVD video players retrieve the digital video, decompress it and convert it to analog video for display on a television. The DVD player has other functions that control the playback such as pause, rewind and fast-forward which are similar to those functions on a video cassette player (VCP). The television allows adjusting the quality of the video displayed. The analog video signal is adjusted by the television to control things such as color, brightness, contrast, sharpness, etc. Digital manipulation techniques are desirable in order to improve the quality of the video displayed and to produce additional effects not normally available to televisions that merely adjust the analog video signal.

There are computer workstations that allow editing digital video off-line. In other words, the digital manipulations of the video on are not performed in real-time. The processing required to perform the manipulation takes massive computational resources over a period of time. In order to edit digital video, the user chooses the desired digital manipulation, the digital video is processed over a period of time and the finished product is displayed. Although digital editing techniques are known, it is desirable to perform these manipulations in real-time such that the user can manipulate the digital video as it is played.

SUMMARY OF THE INVENTION

According to the invention, disclosed are an apparatus and methods for allowing digital manipulation of video information. In one embodiment, a technique for operating a digital versatile disk (DVD) system is disclosed. First digital information is read from a DVD player. The first digital information is decompressed to create second digital information that is stored. In order to produce third digital information different from the second digital information, the second digital information is manipulated. At some point, the third digital information is displayed.

In another embodiment, a DVD system for manipulating information stored on a DVD is disclosed. The DVD system includes a DVD player, buffer, media processing subsystem, and video display. A plurality of digital frames are produced by the DVD player. The buffer stores at least one digital frame. The plurality of digital frames are manipulated by the media processing subsystem to produce a plurality of processed frames. The plurality of processed frames are presented by the video display.

In yet another embodiment, a method for processing digital video in real-time is disclosed. A compressed data stream is read in one step. First motion information between a first plurality of frames associated with the compressed data stream is obtained in another step. In order to produce a second plurality of frames, the compressed data stream is decompressed. A first output frame is produced which is related to the second plurality of frames and the first motion information.

DESCRIPTION OF THE SPECIFIC EMBODIMENTS

The present invention provides methods and an apparatus for manipulating video in the digital domain. After a digital video stream is retrieved from a digital versatile disk (DVD), for example, digital manipulation is performed upon single frames or a series of frames. The digital manipulation is performed upon either a single frame that is frozen on the screen or a series of frames while they are played back in real-time.

In the Figures, similar components and/or features have the same reference label. Further, various components of the same type are distinguished by following the reference label by a dash and a second label that distinguishes among the similar components. If only the first reference label is used in the specification, the description is applicable to any one of the several similar components with a second label.

Figure 1:
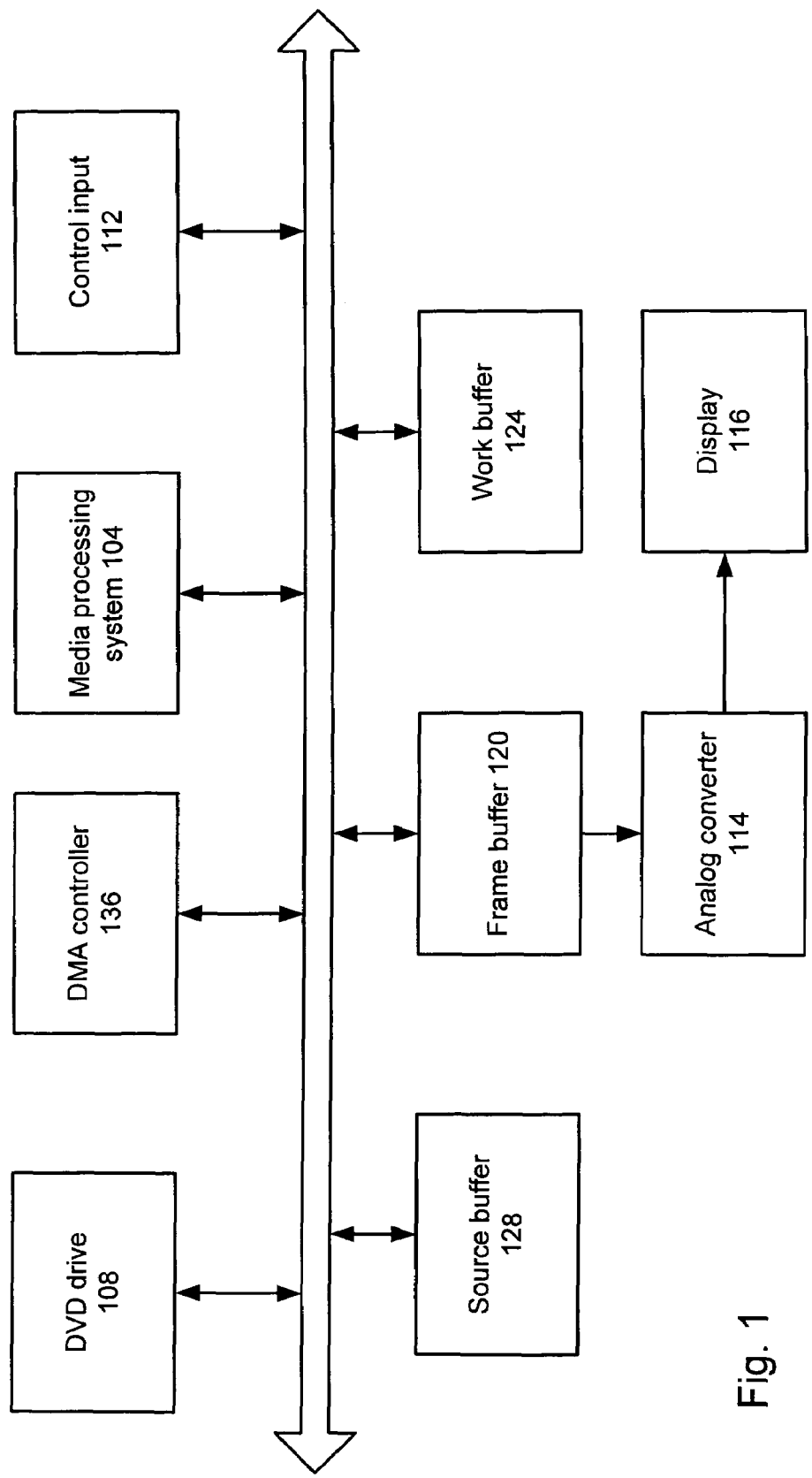
FIG. 1 is a block diagram of an embodiment of a digital versatile disk (DVD) player that allows digital editing during playback.

Referring first to FIG. 1, a block diagram of an embodiment of a DVD player 100 is shown. The DVD player 100 includes a media processing subsystem 104, a DVD drive 108, a control input 112, an analog converter 114, a television display 116, a frame buffer 120, a source buffer 128, a work buffer 124, and a direct memory access (DMA) controller 136. Communication between some of the blocks takes place over a bus 132 where all the blocks attached to the bus 132 have unique addresses. Compressed digital video information is read from a DVD drive 108, decompressed by a software MPEG2 decoder, digitally manipulated, converted to an analog signal, and displayed on the television 116.

The media processing subsystem 104 controls the DVD player 100. Decompression and digital manipulation are the primary functions performed by the media processing subsystem 104. Video and audio is compressed on the DVD drive 108 in an MPEG2 format. MPEG decoding involves converting a video stream of I-, P- and B-frames into digital video frames which are stored in source buffers. Embedded in the MPEG data stream is motion information which quantifies movement of objects in a frame and movement of the camera. The output frames are produced at a rate of at least twenty-four frames per second.

Additionally, the media processing subsystem 104 performs image manipulation on the digital video frames in the digital domain. Information from the MPEG data stream and uncompressed frames are used to enhance the digital manipulations. Things such as contrast enhancement, luminance control, color correction, gamma correction, image sharpening, color saturation adjustment, zoom, embossing, posterization, and warping are performed on the uncompressed output frames. The digital image manipulation is performed upon single frozen frames or moving video in real-time. To facilitate image manipulation, the media processing subsystem 104 overlays menus, cursors and other graphical user interface screen onto the television display 116.

The DVD drive 108 reads optical disks which store compressed digital video. The drive 108 has a spindle which rotates the optical disk and an actuator arm which positions a laser pickup over a track on the disk. The media processing subsystem 104 sends commands to the drive 108 that specify which information to retrieve. After a latency period, the drive 108 writes the information to a track buffer which is available to media processing subsystem 104 by way of the bus 132.

The user can control playback and digital manipulation of the video by way of the control input block 112. This block 112 could include a infrared receiver or connector coupled to a wireless or wired input device such as a remote control, keyboard, mouse, pen tablet, game pad, etc. The input block 112 allows pausing, rewinding, fast-forwarding, and playing the optical disk. When digital manipulation is desired, the user provides commands through the input block 112 in order to select the desired manipulation.

The digital frames are converted to an analog signal by the analog converter circuit 114. Televisions 116 generally receive an analog video signal that is typically modulated on a carrier corresponding to channel three or four. Additionally, the television 116 can be tuned to receive composite video from a composite video input in order to receive the analog video signal. The analog converter 114 receives digital frames of video from the frame buffer 120 at a regular frequency such as thirty frames per second.

The video program is displayed on the television display 116. The remainder of the DVD player 100 is typically housed in an enclosure separate from the television display 116. In order to display the video, the television 116 is tuned to channel three, channel four or the composite input and the components in the enclosure produce a NTSC signal, for example, modulated to the appropriate channel. Other embodiments could use a video monitor or digital display. Use of a digital display would alleviate the need for the analog converter 114 because digital displays, such as liquid crystal displays, use digital information to formulate the displayed picture.

Three buffers 120, 124, 128 are used within the DVD player 100 for processing the digital video. Information passes from the DVD drive 108 to the source buffer 128. In the absence of any digital manipulation, the digital frames are copied directly to the frame buffer 120 without using the source and work buffers 128, 124. When digital manipulation is desired, the source buffer 128 is copied to the work buffer 124. The media processing subsystem 104 retrieves and manipulates portions of the frame in the work buffer 124. After processing, the portions of the frame are sent to the frame buffer 120. Periodically, the frame is streamed from the frame buffer 120 to the analog converter 114 for display on the television 116.

The DMA controller 136 is used to efficiently move large blocks of data without burdening the media processor subsystem 104. By mastering the bus 132, the DMA controller 136 can move a series of data packets from any two blocks without going through the media processing subsystem 104. For example, the media processing subsystem 104 sends control information to the DMA controller 136 in order to enable the DMA controller 136 to copy the source buffer 128 to the work buffer 124. Once the media processing subsystem 104 passes the control information to the DMA controller 136, the subsystem 104 is free to attend to other tasks while the data transfer occurs.

Figure 2:
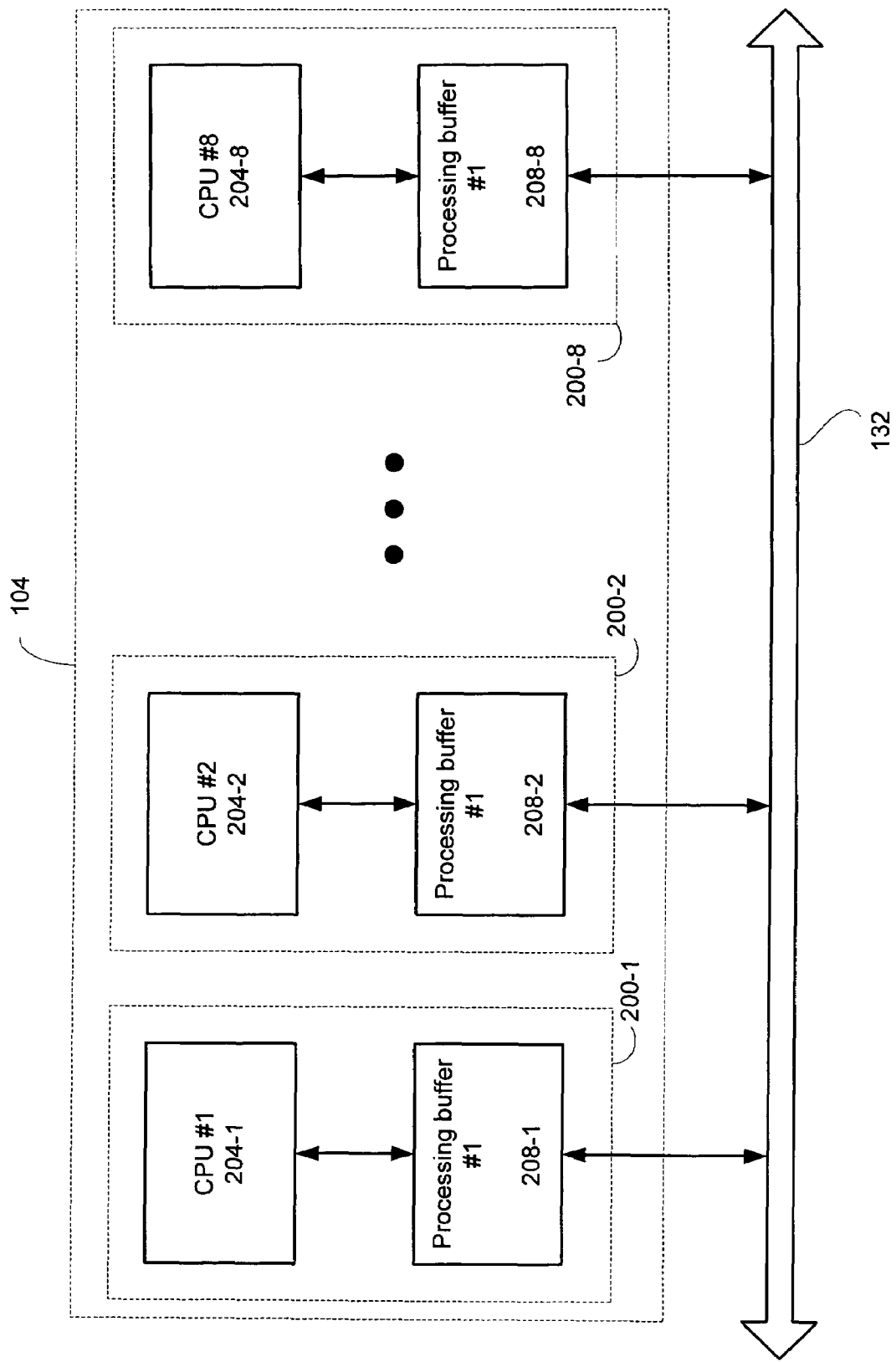
FIG. 2 is a block diagram of an embodiment of a media processing subsystem that has eight media processors.

Referring next to FIG. 2, a block diagram of an embodiment of a media processing subsystem 104, which has eight media processors 200, is shown. The processing subsystem 104 can have any number of processors 200 which work in concert to perform the processing tasks of the DVD player 100. Each media processor 200 includes a processing buffer 208 and a central processing unit (CPU) 204. Processing task are generally divided among the media processors to increase processing throughput. For example, the first media processor 200-1 could perform digital manipulation on the top-left quarter of a frame while the second media processor 200-2 performs digital manipulation of the bottom-left quarter of the frame with other processors 200 assigned right half of the frame. Other embodiments could divide a number of frames such that each processor manipulates one frame at a time, but has considerably more time to complete the processing. For example, processing could begin on a particular frame five frames before the frame is displayed if there were five media processors 200.

The processing buffer 208 is located close to the CPU 204 and provides the fastest access of the memory available to the CPU 204. Typically, the processing buffer 208 is a small synchronous random access memory (SRAM) located on the same substrate as the CPU 204. Generally, the CPU 204 can load from and store to the processing buffer 208 in one clock cycle whereas accesses to other memories may incur wait states. During digital manipulation, small portions of the frame in the work buffer 124 are moved to the processing buffer 208. Once the frame is in the processing buffer 208, digital manipulation is performed by the CPU 204. After the digital manipulation is complete, the result is sent to the frame buffer 120 for display on the television 116.

The eight CPUs 204 work cooperatively to perform digital manipulation, MPEG decoding and other tasks for the DVD player 100. MPEG decoding requires about three CPUs 204 that leaves about five CPUs 204 available for digital manipulation. Other embodiments could have any number of processors 200 working in concert.

Digital manipulation is performed on either frozen frames or moving pictures. A frame is typically 720 pixels across and 480 pixels down which means 345,600 pixels require processing for a frozen frame. In the case of moving pictures, thirty frames per second are typically presented. Accordingly, on-the-fly digital manipulation on moving pictures processes 10,368,000 pixels each second. This embodiment of the CPU 204 has about 108,000,000 execution cycles per second. Each execution cycle may perform multiple operations in parallel, such as an addition, multiplication, memory reference, and branch operations. In this embodiment, up to seven concurrent operations per cycle are supported.

MPEG decoding uses about three processors which leaves five processors for digital manipulation. Five processors allows 540,000,000 execution cycles per second or over fifty-two cycles per pixel. The processing required for digital manipulations can be quantified in execution cycles per pixel. For example, color correction uses sixteen cycles per pixel to manipulate red, green and blue components at the same time; gamma correction uses nine cycles per pixel; and the highly-complex bi-cubic zoom operation requires no more than forty cycles per output pixel. Accordingly, this architecture allows performing digital manipulation on-the-fly. By performing processing in parallel, rather than sequentially, the cycle per pixel cost for performing multiple manipulations is not additive.

Figure 3:
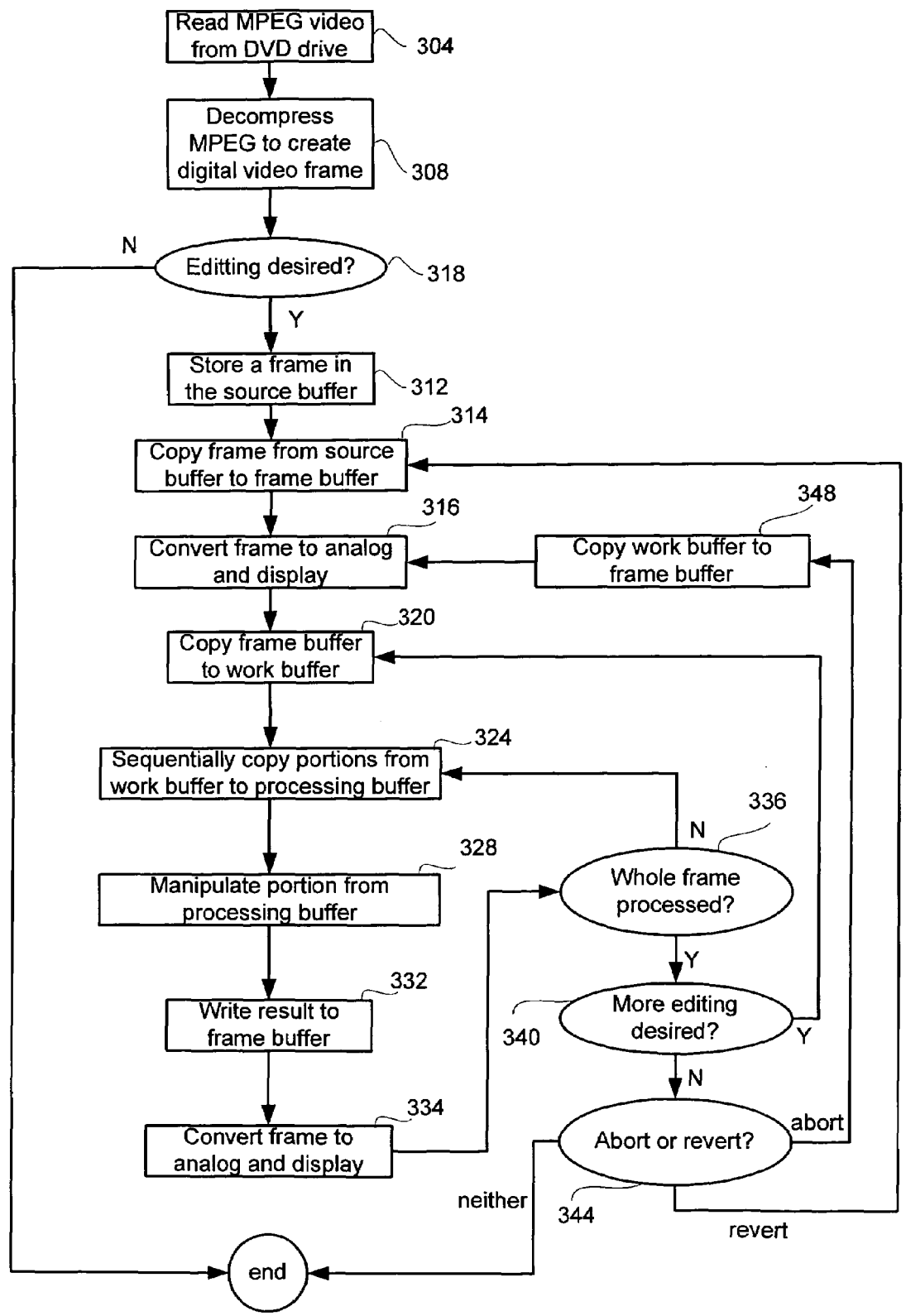
FIG. 3 is a flow diagram that shows a process for manipulating video from a DVD.

With reference to FIG. 3, a flow diagram is shown which manipulates video frames from a DVD. The process shown in FIG. 3 manipulates a single still frame. It is noted that a related process accommodates manipulation of moving images, as explained below. The single frame manipulation process begins by reading compressed video from a DVD drive 108 in step 304. The media processing subsystem 104 sends commands to the DVD drive 108 that responds with logical sectors containing a compressed video stream. Through a software process, the media processing subsystem 104 decompresses the MPEG video stream to produce a series of digital video frames in step 308.

A determination is made in step 318 as to whether digital manipulation of the video is desired. If no manipulation is requested by the user, processing ends after placing a frame in the frame buffer 120. Alternatively, one of the digital video frames is stored in the source buffer 128 in step 312. Next, the frame in the source buffer 128 is copied from the source buffer 128 to the frame buffer 120 in step 314. As discussed more fully above, movement of frames between buffers is often accomplished by using the DMA controller 136. Once the frame is in the frame buffer 120, the frame is converted to an analog signal and coupled to the display 116 in step 316. The frame buffer 120 is copied to the work buffer 124 in step 320. Once the digital video frame is in the work buffer 124, processing begins in piecemeal fashion.

In this embodiment, the processing buffers 208 associated with each CPU 204 do not store a whole frame. Where there are multiple media processors, the frame is usually divided amongst the processing buffers 208 in order to utilize the multiple media processors 200. Even though a particular media processor 200 only processes a portion of the frame, the processing buffer 208 may not be large enough to hold that portion. To accommodate the small size of the processing buffer 208, smaller chunks of the portion of the frame are sequentially loaded into the processing buffer 208 for manipulation.

In step 324, the portions of the frame in the work buffer 124 are doled out to the media processors 200 designated for digital manipulation. Each media processor 200 processes its respective portion of the frame in step 328. Certain operations, which require adjacent pixels in order to perform their processing, may require more than their allocated portion of the frame to execute the operation. Accordingly there may be interaction between the media processors 200 during the processing step 328 in order to get the additional amount. In an alternative embodiment, each media processor 200 could operate upon slightly oversized rectangular areas such that all the possible adjacent pixels needed for some manipulations are available to each media processor 200.

Once the portion of the digital video frame is processed, the results are written to the frame buffer 120 in step 332. This step involves each media processor 200 writing out this information to the frame buffer 120. Once the frame in the frame buffer 120 is modified, the modified frame is converted to an analog signal and displayed on the television 116 in step 334. Next, a determination is made in step 336 as to whether processing is completed for the whole frame. If the whole frame was not processed, the process continues through the loop again. Alternatively, processing continues to step 340 if the whole frame has been processed.

In step 340, a further determination is made regarding whether more editing is desired. More than one manipulation is possible on a still frame so the user is given the opportunity to select a second manipulation. If more editing is desired, processing loops back to step 320. In step 320, the frame buffer 120 with the previous modification is copied to the work buffer 124 for further modification.

The user is given the opportunity to abort the most recent manipulation or discard all manipulations in step 344. If the modifications are acceptable, the manipulation process ends. Alternatively, processing loops back to step 314 if the user wishes to revert to an unedited frame or loops back through step 348 if the user wishes to discard only the last manipulation. If an abort (i.e., discarding the last manipulation only) is desired, the work buffer 124 is copied to the frame buffer 120 in step 348. In this way, the last changes written to the frame buffer 120 are discarded.

In other embodiments, moving pictures could be manipulated. A given operation, such as color correction, is performed on each frame in real-time as it is played back. The abort and revert functions would operate slightly differently to accommodate the moving images. The revert function would stop all digital manipulation on the video and the abort function would only stop the last requested operation. For example, a red color correction, a gamma correction and a zoom operation are requested in that order. An abort would stop the zoom operation and a subsequent revert would stop the color correction and gamma correction.

Figure 4:
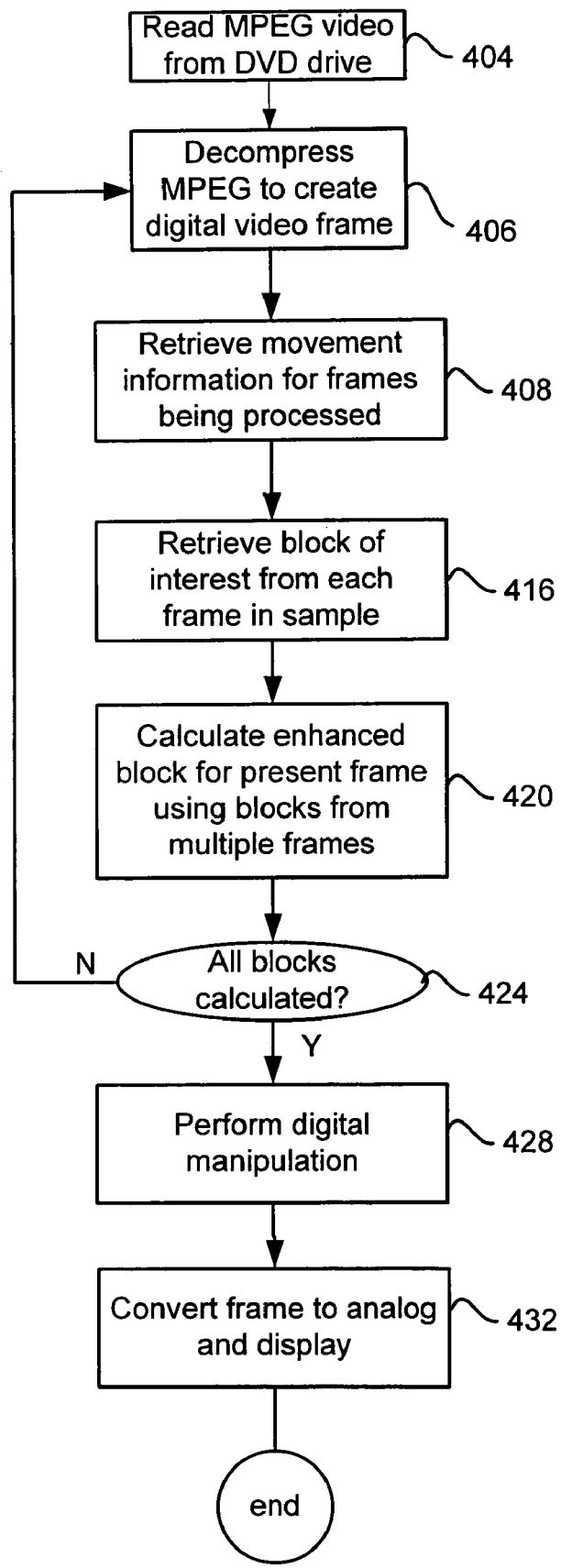
FIG. 4 is a flow diagram that depicts a method for manipulating video using multiple samples for each pixel element.

Referring next to FIG. 4, a method for digitally manipulating a digital video frame is shown which uses multiple samples per pixel in order to improve the clarity of the output frame. This process shows taking a number of MPEG frames to create a processed frame. Although not shown, it is to be understood this process is repeated over and over again for each frame in a video during playback. A compressed MPEG video stream is read from the DVD drive 108 in step 404. The MPEG video stream has movement information embedded within it. The movement information is used in step 406 to decompress the MPEG video stream into a series of digital video frames. The movement information is obtained from MPEG video stream in step 408. With operations such as a zoom operation, only a block of pixels is processed at one time, and only movement information is necessary for the pixels in that block.

Once the video frames and movement information are available, the process of image enhancement of a block can continue. In the case of a zoom operation, for example, the user might use a mouse to select a portion of the screen for blowing-up. That portion defines the block that is extracted from each frame of the sample in step 416. For example, the frames immediately preceding and following the selected frame could be used. Motion information could be used to determine the corresponding block in each adjacent frame. In this way, three samples are available for each pixel in the block. Correcting for movement may include interpolation or other techniques to achieve alignment between the pixels.

In step 420, an enhanced block is calculated from the three samples. By averaging over a number of frames artifacts such as noise are removed from the block. A determination is made in step 424 as to whether there are additional blocks which need enhancement. For certain functions such as sharpening, a whole frame is processed. To reduce the amount a media processor 200 accepts at one time, the frame is divided into smaller blocks. Additionally, division into blocks allows doling out the frame to a number of media processors 200. If blocks still need enhancement, as determined in step 424, processing continues through the loop again.

Alternatively, digital manipulation is performed on the frame or block in step 428, if the enhancement is complete. These manipulations include such things as contrast enhancement, luminance control, color adjustment, gamma correction, image sharpening, color saturation adjustment, and zoom along with such fanciful effects such as embossing, posterization and warping. Once digital manipulation is complete, the frame is converted to an analog signal and displayed on the television 116 in step 432.

In light of the above description, a number of advantages of the present invention are readily apparent. Use of digital manipulation techniques with images from a DVD player improves the quality of the video displayed and produces additional effects not normally available to analog manipulations. The above invention also performs digital manipulations in real-time such that the user can manipulate the video as it is played.

A number of variations and modifications of the invention can also be used. For example, the above embodiments display the frame on a television. However, other embodiments could use a digital display such as a liquid crystal thin film transistor display. Digital manipulation is especially important with digital displays as there is no analog signal to perform analog manipulation upon.

The digital manipulation described above can be performed upon moving pictures on-the-fly. Sufficient processing power is made available by the media processing subsystem to both decompress the video stream and perform digital manipulations before each frame is displayed. The user selects the desired digital manipulation through the control input block. After the selection is made, all future frames are displayed after performing the desired manipulation.

I. Gamma Correction Example:

This is a technique for brightening the dark regions of an image without bleaching out the lighter regions. A value of gamma is chosen, typically between 1.0 and 2.0, and the luminance of each source pixel is modified according to the formula:

$$y=x^{(1/gamma)}$$

where x and y are input and output luminances each in the range 0 to 1. If gamma=1, then output and input are the same; if gamma=2, then $y=x^{(1/2)}=\sqrt{x}$; the graph shows a vertical tangent at the origin, which implies a huge boost to low-illuminance (dark) regions. But the curve levels off and has a small slope at the high end, so that bright regions are affected much less.

In practice, a lookup table (LUT) is created that allows mapping of either the luminance component directly, or of RGB components separately after color-space conversion (from YCrCb to RGB). Tight inner loop coding makes the replacement operation fast, but the problem of generating the LUT on the fly remains.

The user controls gamma, and $y=x^{(1/gamma)}$ would be implemented in C using the library function pow(x, 1/gamma). This proved to be much too slow, since it is carried out in double precision floating point, itself done without direct hardware support. Therefore, a special purpose routine was created.

Mathematically, $$y=x^{(1/gamma)}=\exp(\log(x)/gamma)$$

which involves both a logarithm and an exponential. But the logarithm is computed at the fixed locations i/255.0 for i=1 to 255, and these values can be precomputed and read from a table. Given gamma, one computes its reciprocal k=1/gamma, then multiplies each of the tabulated logarithms by k and takes the exponential. Thus, the problem reduces to an efficient way of computing exp( ). That is achieved by the following code, which enforces computation in single precision floating point.

```
static
    float a0 = .9997996524,
        a1 = -.9932521732,
        a2 = .4641292016,
        a3 = -.1029975871;
// compute approximation to exp (-x) for x >= 0
float FunkyExp (float x)
{
    int squarecount = 0;
    float y, half = 0.5;
    while (x > 1) {
        x *= half;
        squarecount++;
    }
    y = a0 + (a1 + (a2 + a3*x)*x)*x;
    while (squarecount-- > 0) {
        y = y*y;
    }
    return y;
}
```

Figure 5:
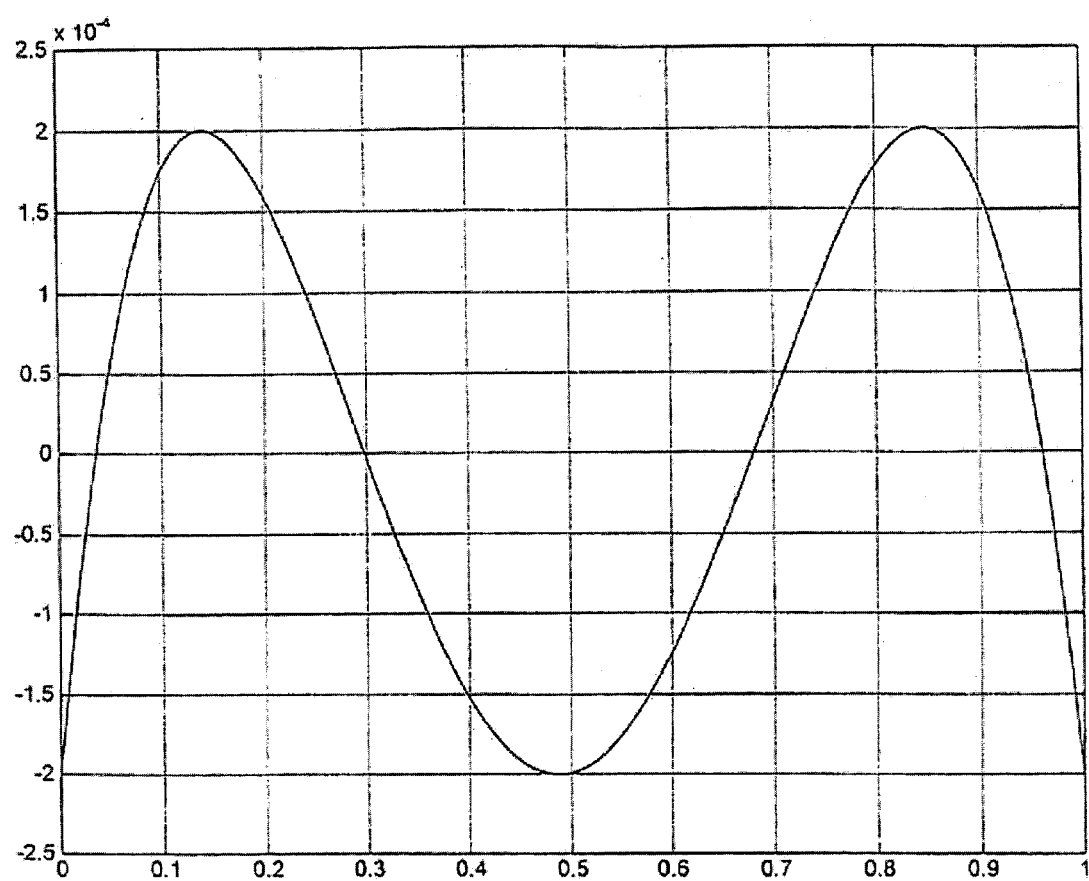
FIG. 5 is a graph of an approximation of the error from using the cubic polynomial $a0+(a1+(a2+a3*x)*x)*x$ to represent $\exp(-x)$.

The coefficients a0, a1, a2, a3 define a cubic polynomial that approximates exp(-x) for x between 0 and 1. The coefficients are chosen to minimize the error over this interval; FIG. 5 shows a plot of the error, clearly indicating that it is never outside the range +−0.0002. The function FunkyExp( ), shown above, carries out a range reduction to force its positive argument into the desired range, and then applies the polynomial using Horner's method:

$$y=a0+(a1+(a2+a3*x)*x)*x$$

which is the same as $$y=a0+a1*x+a2*x^2+a3*x^3$$

but more efficient computationally. Then, the effect of range reduction is reversed by repeated squaring.

Using this, the code to initialize the LUT given gamma is:

```
void SetLUT (float gamma, char *lut)
{
    int i;
    float x, y, p, one = 1.0, tff = 255.0, half = 0.5;
    p = one / gamma;
    lut [0] = 0;
    lut [255] = 255;
    for (i = 1; i < 255; i++) {
        y = p * logtable [i];
        x = tff * FunkyExp (-y);
        lut [i] = x + half; //force rounding
    }
}
```

Here logtable[ ] is the precomputed table of logarithms, read in from a header file. The result of this ploy was to speed up computation of the LUT by over a factor of 10, which rendered the overall operation practical.

II. Bicubic Zoom Example

Figure 6:
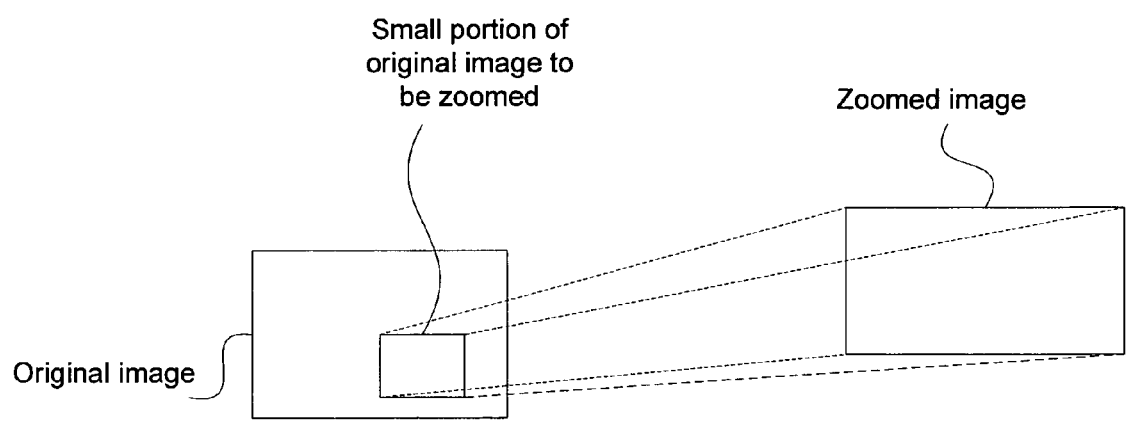
FIG. 6 is a block diagram that shows a portion of the original image enlarged.

The nature of zooming is suggested in FIG. 6. A small portion of the source image is expanded to form a zoomed image which fills the entire viewing area. The dashed lines suggest the mapping of the corners of the small source region onto the corners of the output display. This is a linear mapping: for example, the center of the small source region is mapped to the center of the display.

To compute the color of each output pixel, one must examine its counterpart back in the small source region. This amounts to inverting the mapping we've just described, and it is a simple mathematical operation. We examine this in detail in FIGS. 7 and 8. Here, we begin at the right with a vertical scanline of pixel centers A, B, C, and so on. These are mapped back into the source region as A', B', C', and so on. Notice that the source points (primed letters) are closer together: they belong to the region that is being magnified by the zoom operation. In fact, the zoom factor is the distance AB divided by the distance A'B'.

As shown, A' does not lie exactly on a pixel center (grid intersection) in the source region. There are surrounding pixel centers, shown with heavy dots, that can referenced by giving row and column coordinates. For example, A' is closest to the pixel at the intersection of row 2 and col 2—we might say Pixel(2,2). The simplest approach is to use the color of this pixel as the color of A. This is known as the "nearest neighbor" technique, and it has the drawback of producing a pixilated output image. For, as shown, B, C, and D will all take on the color of Pixel(3,2), since this is the pixel nearest B', C', and D'.

Unless one wants the "fatbits" appearance—and one sometimes does, which it why it is offered as an option—one prefers the smoother result from interpolating among several nearby pixels. Bilinear interpolation uses the surrounding four, and bicubic interpolation achieves an even better result by using the surrounding sixteen. The extra quality comes at a heavy computational cost, and making this operation run quickly presented several challenges.

First, there's the interpolation formula itself. Cubic interpolation is carried out separately in the horizontal and vertical direction, each such operation involving expressions of the form val=$H(-1-\text{frac})*P0+H(-\text{frac})*P1+H(1-\text{frac})*P2+H(2-\text{frac})*P3$.

Here, the samples being interpolated are P0 through P3, and val is the result. frac lies between 0 and 1, and measures the fractional departure from a gridpoint (or line, in the two-dimensional case). The weighting coefficients are computed from a function, H( ), that is built up from separate cubic polynomials:

```
double H (double x)
{
    static double a = -0.5;
    double u;
    u = fabs (x)
    if (u >= 2)
        return 0;
    else if (u >= 1)
        return a* (-4 + u* (8 + u* (-5 + u) ) );
    else
        return 1 + u*u* (-(a+3) + u* (a+2) );
}
```

Figure 7:
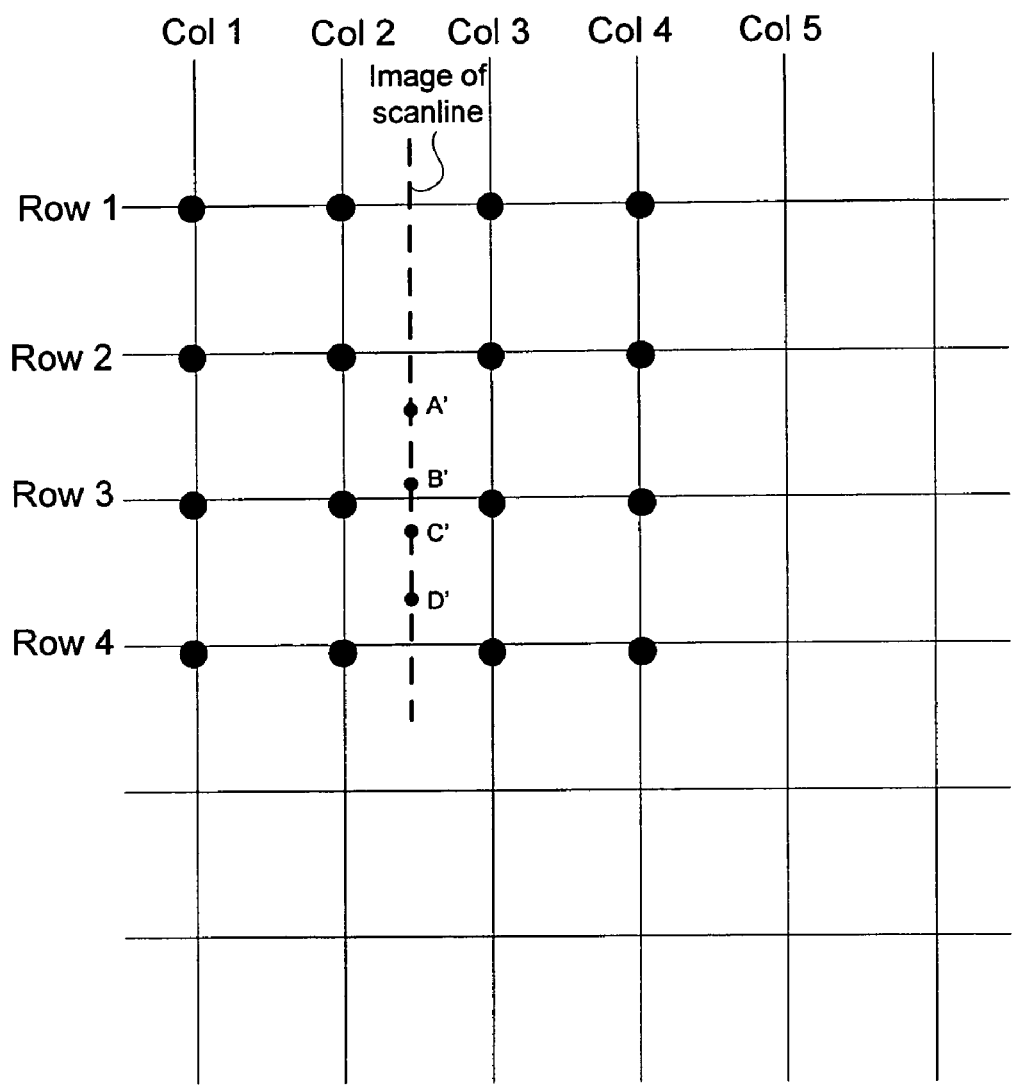
FIG. 7 is a diagram that schematically represents a scan line of an un-zoomed image.
Figure 8:
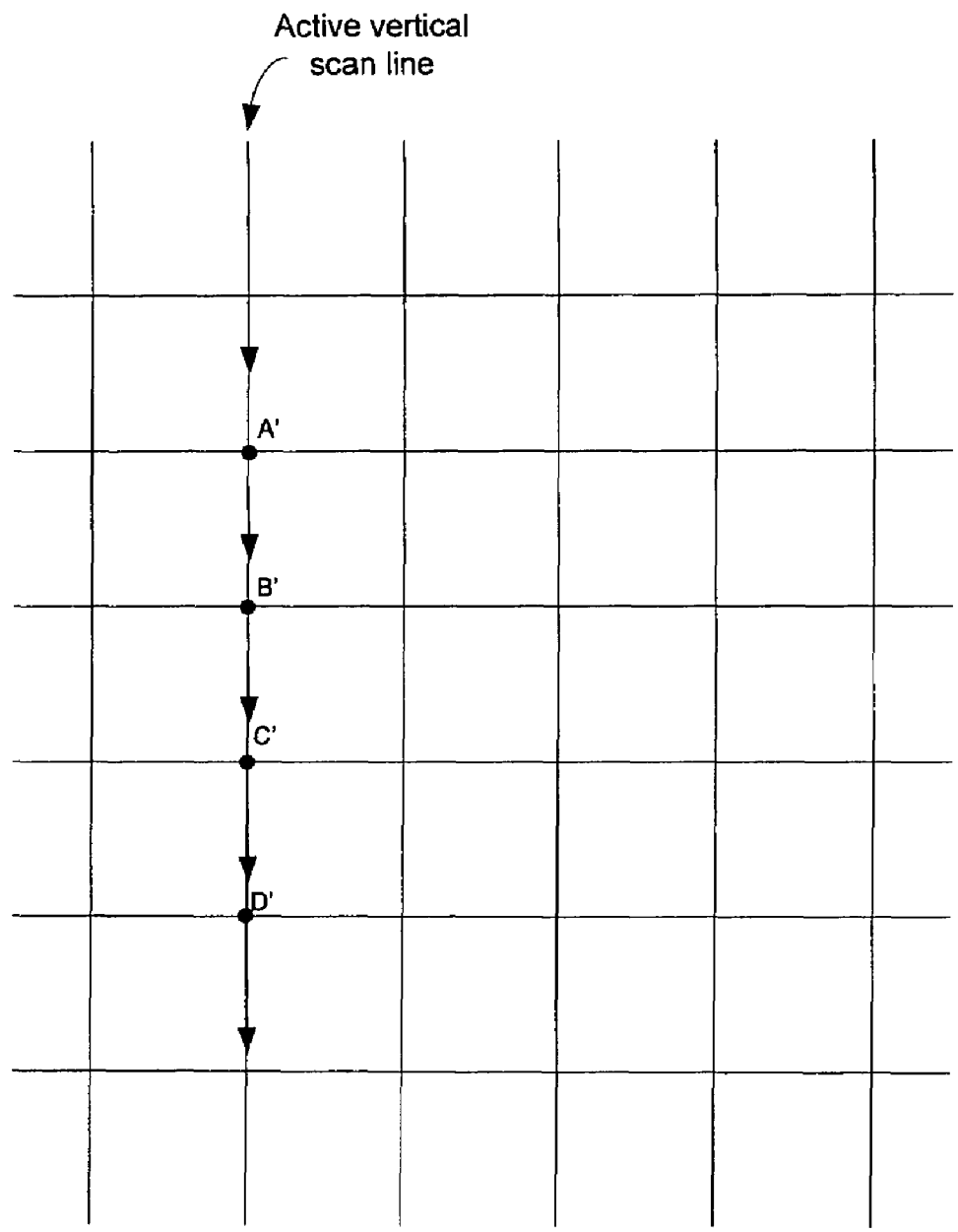
FIG. 8 is a diagram that schematically represents a scan line of the zoomed image.

With reference to FIG. 7, frac is the separation of the dashed scanline image from the vertical gridline to its left for horizontal interpolations; this is a constant along the scanline, and the weighting coefficients can be computed just once. But for interpolating in the vertical direction, frac refers to the distance from the previous horizontal gridline, and this changes from A' to B' to C', and so on.

The scheme that makes this practical is similar to the one used for gamma correction: create a LUT with values of H( ) precomputed at a sufficient number of points, and read this in from a header file. In this implementation, 1024 points are used, and frac is rounded to 10 bits in order to index this table.

One final performance issue is novel enough to warrant special comment. At A' we form an interpolation (weighted average) over pixels from Pixel(1,1) at upper left to Pixel (4,4) at lower right. At B', these same 16 pixels are used. For a magnification of 5, we expect the same set of 16 pixels to be reused about five times. Naturally, these pixels are kept in local RAM for ready access.

But when we cross a horizontal gridline, as we do in going from B' to C', the set of 16 pixels has to change. The row 1 pixels become irrelevant, and another set of four pixels must be accessed from row 5. Since the image buffer lives in External RAM, the first such reference will cause an expensive cache miss.

Now the reason for scanning in the vertical direction can be explained. When the first pixel in row 5 is accessed, all four of the pixels we want from row 5 will be paged in at the same time. That is because they occupy successive locations in External RAM. Had we adopted the more usual convention of scanning pixels horizontally, we would have encountered instead the need to access four more pixels at once from column 5: each of those pixels lives on a different raster line of the source image, so that four separate cache misses would have been provoked. The performance, in this case, would have been significantly degraded.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A method of enhancing a selected digital video frame, or a portion thereof, included in a single layer digital video stream, comprising:

selecting from the single layer digital video stream, a particular one of the digital video frames for enhancement;

selecting from the single layer digital video stream from which the particular one of the digital video frames for enhancement was selected, any others of the digital video frames;

enhancing the video quality of the selected digital video frame by incorporating information included in the other digital video frames into the blocks of the particular digital video frame; and displaying the enhanced digital video frame without reference to the other digital video frames.

2. The method as recited in claim 1, further comprising obtaining movement information for the selected digital video frame and the other digital video frames.

3. The method as recited in claim 2, further comprising:

wherein when only a portion of the selected video frame is to be enhanced then, identifying portions of the other digital video frames corresponding to the portion to be enhanced; and enhancing the video quality of the portion by incorporating information included in the corresponding other digital video frame portions into the portion of the selected video frame.

4. The method as recited in claim 3, further comprising:
wherein when the enhancement is complete,
selecting another frame of the single layer digital video stream for enhancement; and
continuing the selecting until all of selected digital video frames, or portions thereof, have been enhanced.

5. The method as recited in claim 4, wherein when all of the selected digital video frames or portions thereof have been enhanced, then
manipulating selected ones of the enhanced digital video frames or portions.

6. The method as recited in claim 5, wherein the method is executed by a processor unit included in a digital video disc (DVD) player.

7. The method as recited in claim 1, wherein the enhancing includes a combination of some operations is selected from a group comprising: a contrast enhancement operation, a luminance control operation, a color adjustment operation, a gamma correction operation, an image sharpening operation, a color saturation operation, and a zoom operation.

8. Computer program product for of enhancing a selected digital video frame, or a portion thereof, included in a single layer digital video stream, comprising:
computer code for selecting from the single layer digital video stream, a particular one of the digital video frames for enhancement;
computer code for selecting from the single layer digital video stream from which the particular one of the digital video frames for enhancement was selected, any others of the digital video frames;
computer code for enhancing the video quality of the selected digital video frame by incorporating information included in the other digital video frames into the particular digital video frame;
computer code for displaying the enhanced digital video frame without reference to the other digital video frames; and
computer readable medium for storing the computer code.

9. The computer program product as recited in claim 8, further comprising
obtaining movement information for the selected digital video frame and the other digital video frames.

10. The computer program product as recited in claim 9, further comprising:
wherein when only a portion of the selected video frame is to be enhanced then,
computer code for identifying portions of the other digital video frames corresponding to the portion to be enhanced; and
computer code for enhancing the video quality of the selected digital video frame by incorporating information included in the other digital video frames into the particular digital video frame.

11. The computer program product as recited in claim 10, wherein when the enhancement is complete, further comprising:
computer code for selecting another frame of the single layer digital video stream for enhancement; and
computer code for continuing the selecting until all of selected digital video frames have been enhanced.

12. The computer program product as recited in claim 11, wherein when all of the selected digital video frames or portions thereof have been enhanced, then
computer code for manipulating selected ones of the enhanced digital video frames or portions.

13. The computer program product as recited in claim 12, wherein the computer program product is executed by a processor unit included in a digital video disc (DVD) player.

14. Computer program product as recited in claim 8, wherein the enhancing is selected from a group comprising: a contrast enhancement operation, a luminance control operation, a color adjustment operation, a gamma correction operation, an image sharpening operation, a color saturation operation, and a zoom operation.

15. An apparatus for enhancing a selected digital video frame, or a portion thereof, included in a single layer digital video stream, comprising:
means for selecting from the single layer digital video stream, a particular one of the digital video frames for enhancement;
means for selecting from the single layer digital video stream from which the particular one of the digital video frames for enhancement was selected, any others of the digital video frames;
means for enhancing the video quality of the selected digital video frame by incorporating information included in the other digital video frames into the particular digital video frame; and
means for displaying the enhanced digital video frame without reference to the other digital video frames.

16. An apparatus as recited in claim 15, further comprising
means for obtaining movement information for the selected digital video frame and the other digital video frames.

17. The apparatus as recited in claim 16, further comprising:
wherein when only a portion of the selected video frame is to be enhanced then,
means for identifying portions of the other digital video frames corresponding to the portion to be enhanced; and
means for enhancing the video quality of the selected digital video frame by incorporating information included in the other digital video frames into the particular digital video frame.

18. The apparatus as recited in claim 17, further comprising:
wherein when the enhancement is complete,
means for selecting another frame of the stream of digital video frames for enhancement; and
means for continuing the selecting until all of selected digital video frames have been enhanced.

19. The apparatus as recited in claim 18, wherein when all of the selected digital video frames or portions thereof have been enhanced, then
means for manipulating selected ones of the enhanced digital video frames or portions.

20. The apparatus as recited in claim 19, wherein the apparatus is included in, or associated with, a digital video disc (DVD) player.

21. An apparatus as recited in claim 15 wherein the enhancing is selected from a group comprising: a contrast enhancement operation, a luminance control operation, a color adjustment operation, a gamma correction operation, an image sharpening operation, a color saturation operation, and a zoom operation.

* * * * *